May 23, 1961 W. R. STEPHENS 2,985,513
LIQUID FERTILIZER PROCESSING EQUIPMENT
Filed Feb. 4, 1959 3 Sheets-Sheet 1

INVENTOR.
Will R. Stephens
BY Ooms, McDougall,
Williams & Hersh
Attorneys

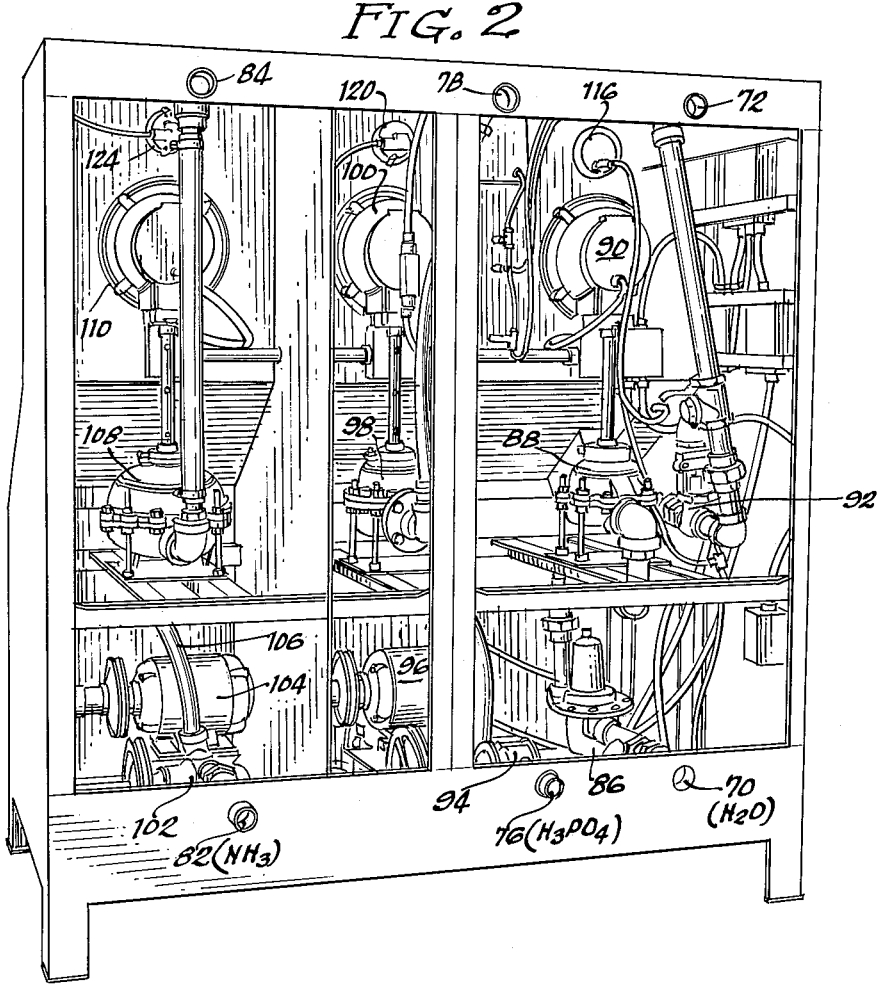
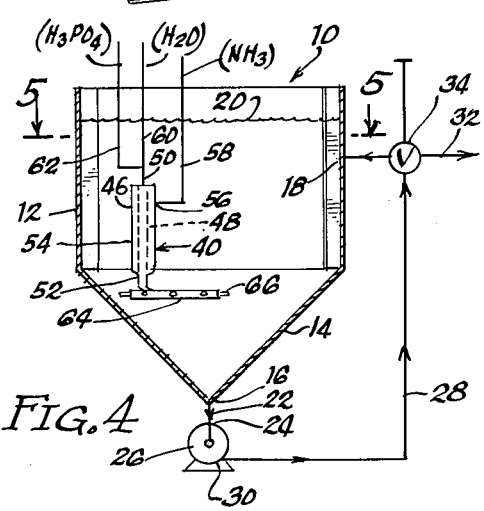
INVENTOR.
Will R. Stephens

INVENTOR.
Will R. Stephens
BY
Ooms, McDougall, Williams & Hersh
Attorneys

United States Patent Office 2,985,513
Patented May 23, 1961

2,985,513
LIQUID FERTILIZER PROCESSING EQUIPMENT
Will R. Stephens, Cedar Rapids, Iowa, assignor to Barnard & Leas Manufacturing Company, Inc., Cedar Rapids, Iowa
Filed Feb. 4, 1959, Ser. No. 791,204
13 Claims. (Cl. 23—259.1)

This invention relates to processing equipment for use in the fertilizer industry, and it relates more particularly to a portable unit for use in the preparation of a mixed liquid fertilizer containing controlled amounts of nitrogen, phosphorus and potassium uniformly distributed in a dissolved state as phosphoric acid, aqua ammonia, and potash or potassium chloride.

It is an object of this invention to produce a unit of the type described which is compact in construction and simple in operation, thereby to enable assembly into a unit capable of transportation for use at different sites in the preparation of aqueous fertilizer systems; which is capable of making use of liquid or solid components in preparation of the liquid fertilizer; which is capable of automatic operation for admixture of the materials in the desired amount in preparation of a fertilizer of controlled formulation; which is capable of adjustment to vary the formulation or ratio of ingredients to meet existing requirements; which permits the use of superphosphate in the formulation of the fertilizer in a manner to produce a lower cost and more stable fertilizer in which a higher concentration of potash is capable of being incorporated, and which produces a more stable fertilizer permitting wider variations in its formulation; which is capable of use for more rapid and efficient processing to produce a finished product of greater uniformity; which effects solutions and mixtures of materials without excessive increase in temperature and without entrapment of air or other foreign materials, and which is capable of operation on a batch principle without experienced labor or excessive supporting equipment, thereby to permit utilization of the equipment at various locations to maximize the use of the equipment in the preparation of liquid fertilizers and the like.

These and other objects and advantages of this invention will hereinafter appear and for purposes of illustration, but not of limitation, an embodiment of the invention is shown in the accompanying drawings, in which—

Figure 2 is a perspective elevational view of the interior of the batching unit embodying the features of this invention;

Figure 4 is a schematic elevational view of the liquilizer;

Figure 5 is a sectional view taken along the line 5—5 of Figure 4; and

Figure 1:
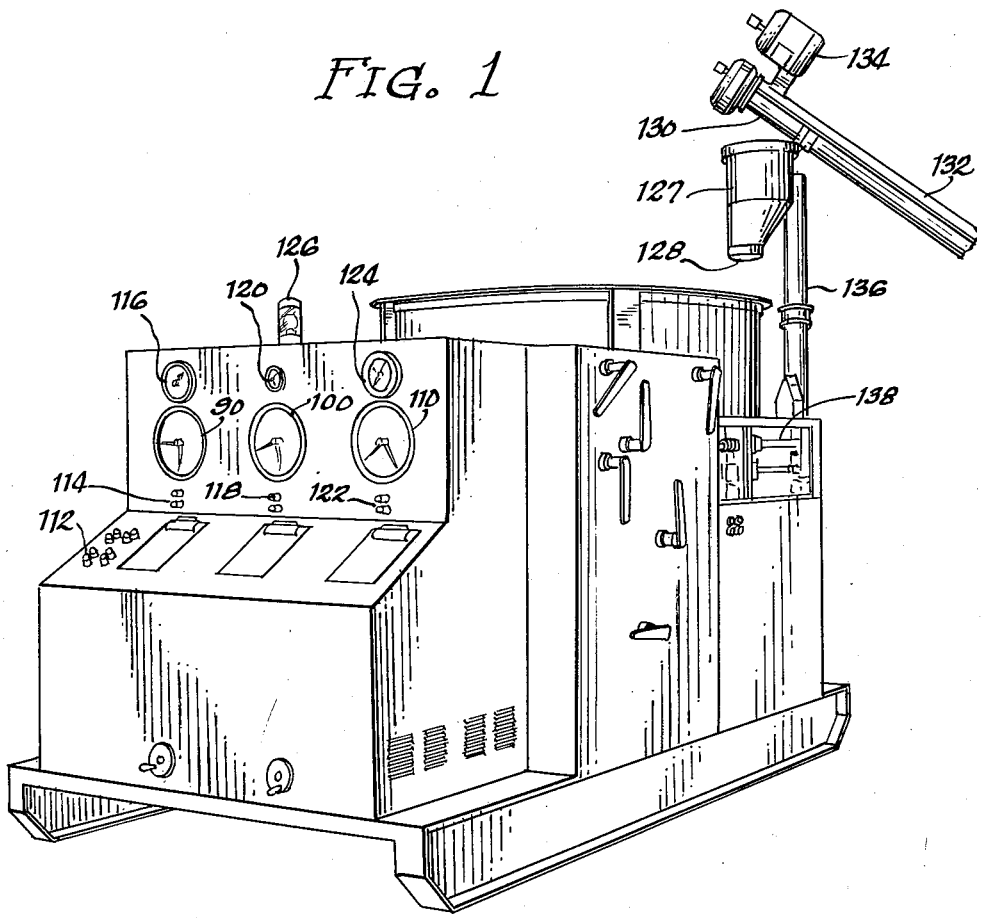
Figure 1 is a perspective elevational view of the device embodying the features of this invention.

Before entering into the construction and operation of the equipment, description will first be made of a portion of the equipment embodying new and novel features for use in combining materials in a dissolved state in an aqueous system, and wherein the materials become uniformly distributed into a homogeneous product. It will be understood that the device herein described can be used for the solution of materials other than liquid fertilizer materials, in the processing industry.

The unit hereinafter referred to as the liquilizer, see Figures 1, 3, 4 and 5, comprises a large tank 10 having an upper portion 12 of cylindrical shape and a lower end portion 14 of conical shape, with the base of the conical section uppermost to extend as a continuation from the lower end of the cylindrical section 12.

The tank is provided with an outlet opening 16 at the apex of the conical section at the bottom of the tank, and a liquid inlet 18 in the side of the cylindrical section and spaced from the top of the tank by an amount to position the inlet below the level of the liquid 20 in the tank, when in operation. The line 22 communicates the outlet opening 16 with the inlet 24 of a motor-driven impeller pump 26, and line 28 communicates the outlet 30 of the impeller pump with the inlet opening 18 whereby the impeller pump causes rapid circulation of the liquid through the tank from the inlet at the top to the outlet at the bottom. Line 28 is provided with a branch line 32 for communicating the outlet of the impeller with storage for the delivery of product, and a hand-operated valve 34 is provided in the connection to control the flow of fluids into the one line for recirculation through the tank or the other line for delivery of product from the tank to storage.

The inlet opening 18 is provided with a nozzle 36 for directing the liquid angularly into the tank whereby a swirling action is generated about the tank by reaction to the liquid introduced. It is preferred to arrange the nozzle for tangential introduction to maximize the swirling action, but swirling movement can be achieved when the angular relation of the nozzle is within the range of 0–30° with the tangent.

Arranged in circumferentially spaced-apart relation about the inner surface of the cylindrical section 12 are a plurality of vertically disposed baffle plates 38 extending inwardly in angular relation with the radius and in the direction of swirling movement of the liquid. The baffle plates may be dimensioned to have a length corresponding to the length of the cylindrical section to extend from the top to the bottom, but it will be sufficient if they extend only partially through the depth of the liquid in the cylindrical section, and they may be dimensioned to have a width ranging from $\frac{1}{10}$ to $\frac{1}{40}$ of the diameter of the tank. It is preferred to position the baffle plates in the direction of turning movement of the liquid at an angle of about 65°, plus or minus 10° with the radius.

Vertically disposed within the tank, and preferably adjacent the lower end of the cylindrical section, is a jet-type mixer 40 of the type described and claimed in my copending application Serial No. 624,840, filed November 28, 1956, and entitled "Method and Apparatus for Producing Liquid Reaction Products," for admixture under pressure of various chemical liquids without interferences in the smoothness of operation by reason of the chemical reactions taking place and for supply of the materials in admixture to the liquids in the tank in a manner to effect complete and immediate blending therewith, whereby the temperatures of reaction are maintained at a safe and desirable level.

Briefly described, the jet mixer and blender 40 comprises an outer tubular member 46 fixed in sealing relationship about the periphery of an inner tubular member 48 having an inlet 50 at one end and an outlet 52 at the opposite end. The inner tubular member 48 communicates with the space 54 defined between the inner and outer members through a plurality of small jet openings extending angularly through the inner tubular member in the direction of fluid flow from the outer surface inwardly to the passage through the inner member. The outer housing is provided with an inlet 56 intermediate its length, and line 58 communicates the inlet 56 with a supply of aqua ammonia under pressure.

The inlet 50 is connected by line 60 to the feed water under pressure, and line 62, coupled to line 60 immediately in advance of the jet mixer, communicates the inlet with phosphoric acid under pressure.

The outlet 52 of the jet mixer communicates with a header 64 having sprayheads 66 extending in various angular directions therefrom to spray the liquid from the mixer in a substantially horizontal direction for admixture with the liquids in the tank.

By the combination of jet mixer, which is operative under pressure, and the distributor whereby the reaction materials from the mixer are introduced into the body of the liquid in the tank, it is possible to effect the combination of materials which would otherwise be difficult in conventional practice by reason of the extremely high temperatures of reaction which would be generated or by reason of the vapors which might be released.

As described in the aforementioned copending application, operation of the jet mixer with liquids under pressure prevents the formation of vapors which might otherwise be released if operation were carried out under atmospheric conditions in conventional mixing equipment. Arrangement of the communicating jets between the outer chamber and the inner tubular member whereby the aqua ammonia is brought into combination for reaction with the phosphoric acid-water solution provides for a type of Pitot action which smoothly draws the ammonia into flow with the phosphoric acid solution, whereby combination can be effected smoothly and without the bumping or noise which would otherwise be caused by the combination of such reactive materials.

The combination described by which the aqua ammonia is brought into combination with the phosphoric acid and immediately sprayed outwardly into a large body of liquid for admixture therewith, permits the use of materials which might otherwise not be possible. For example, it is known that superphosphoric acid (105% $H_3PO_4$) becomes unstable when exposed for any period of time at a temperature in excess of 180° F., and that instability results in the formation of the pyro form of the phosphoric acid with corresponding increase in the temperature of crystallization from 30° F. to about 60° F. The combination of superphosphoric acid with water in the amounts required for use in a liquid fertilizer and subsequent reaction upon addition of aqua ammonia operates to raise the temperature to about 220° F. which would lead to instability except for the fact that the materials are mixed while flowing rapidly through the jet mixer and immediately introduced into the body of liquid at a temperature below 180° F., such that it becomes possible to make use of superphosphoric acid in the system described. This permits the use of a more available and lower cost acid, and it further permits the possibilities of incorporating higher concentrations of potash, as in the preparation of a 4-12-12 fertilizer liquid. It is believed that the use of superphosphoric acid, permitted by the system described, results in a more stable system. It will be understood, however, that the concepts of this invention will also permit the use of regular furnace grade acid in the preparation of a liquid fertilizer.

In operation of the liquilizer unit described, phosphoric acid fed in line 62 under pressure is mixed with water fed under pressure through line 60. The phosphoric acid-water continues to flow together under pressure through the central passage 48 of the jet mixer from the inlet end 50 to the outlet end 52. Flow of liquid through the central passage operates smoothly to draw aqua ammonia supplied under pressure from line 58 to the annular space 54 about the tubular sections. Such mixture under pressure obviates vaporization of any of the components even though the temperatures might be raised considerably in response to the neutralization of the acid with ammonia. The liquid issuing under pressure from the jet mixer is sprayed horizontally from the angularly arranged nozzles of the header 64 substantially completely and immediately to blend the mixed liquids into the body of liquid flowing through the mixer, thereby to avoid the breakdown of materials at elevated temperature which would otherwise impose limitations upon the type of phosphoric acid used.

The rapid circulation of liquid through the tank from the inlet at the top to the apex at the bottom provides for a circular flow of liquid concurrently with a downward flow to provide for controlled agitation throughout all sections of the tank, supplemented by the agitation which is effected by the introduction of the mixed liquids issuing from the jet mixer in an intermediate portion of the body of liquid. This brings all of the liquids into admixture without permitting any of the solids to settle out such that potash or other salts, continuously or batchwise to the tank, are almost immediately taken into solution and uniformly distributed throughout the system.

The three-way valve 34 controls the flow of fluid from the pump 26. In one position, it recirculates the liquid into the tank for normal operation to take the materials into solution. In another position, it bypasses the tank and causes liquid delivered by the pump to flow through line 32 as product for storage or use.

Figure 3:
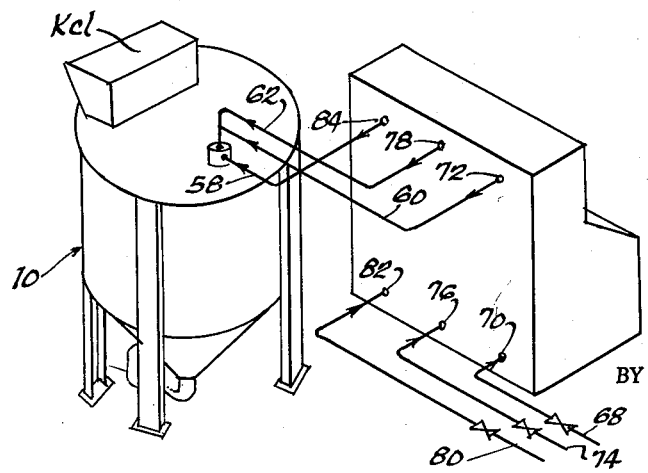
Figure 3 is a schematic diagram illustrating the arrangement of elements and the flow of materials.

Each of the liquid feed pipes 58, 60 and 62 is connected to a batching unit for automatically measuring the amount of each of the liquids introduced into the system. A new and novel device adapted for use in measuring such controlled amounts of liquid is illustrated in Figures 1-3 of the drawings.

Line 68 connects the supply of water under pressure to the inlet 70 of the batching unit, and the line 72 connects the outlet of the batching unit with the line 60 leading to the liquilizer.

Line 74 connects the source of supply of phosphoric acid with the inlet 76 of the batching unit, and line 78 connects the outlet to the line 62 leading into the liquilizer.

Line 80 communicates the source of supply of aqua ammonia with the inlet 82 of the batching unit, and line 84 communicates the outlet with the line 58 to the liquilizer.

The inlet 70 connects through a water trap 86 to a meter 88 for measuring the quantity of water introduced into the system. The meter is connected to a gauge 90 which can be set for the amount of water to be introduced per batch into the liquilizer. From the meter, the water line connects to a solenoid-operated valve 92 which is responsive to the recorder 90 for operation of the valve to control water flow.

The inlet 76 communicates with a pump 94 driven by a motor 96 for raising the pressure of phosphoric acid which flows from the pump through a meter 98 which operates a recorder 100. The latter can be set for flow of a predetermined amount of phosphoric acid and it operates through the motor-driven pump 94 to control fluid flow.

Similarly, the aqua ammonia flows from the inlet 82 to a pump 102 operated by a motor 104. The aqua ammonia flows from the pump 102 through line 106 to a meter 108 adapted to operate a recorder 110, and the latter is effective to stop the operation of the motor-driven pump 102 when the required amount of aqua ammonia has been delivered.

Referring now to the control panel of the batching unit in Figure 1, lights 112 on the front face of the panel constitute pilot lights to indicate when the liquilizer is in operation. The numeral 114 indicates pilot lights for indicating water flow, and the pressure of the water is indicated by the gauge 116. Pilot lights 118 are for the phosphoric acid system to indicate flow, while the tachometer 120 measures the amount of phosphoric acid that has been used. Similarly, pilot lights 122 are operative in the aqua ammonia system and the tachometer 124 measures the flow of aqua ammonia. The flasher 126 is connected in the electrical circuit to indicate the operation of the fluid flow controls in feeding various liquids to the liquilizer.

The potash or other solids can be weighed out in advance and introduced batchwise into the tank for solution. In the automatic system illustrated in Figure 1, the potash may be fed automatically at a controlled rate and in timed sequence with the rest of the materials. For this purpose, a hopper 127 is fixed to the upper edge of the tank with the outlet 128 at the bottom overlying an opening in the top of the tank, while the open end at the top of the hopper is in vertical alignment with the outlet end 130 of a feed conveyor 132 driven by motor 134. The hopper can be mounted on a shaft 136 supported by an arm of the scale 138 to measure the amount of potash introduced into the hopper for batch operation. The conveyor feed is controlled by the scales to supply a predetermined amount of potash which can be varied by presetting the weights on the scale.

Figure 6:
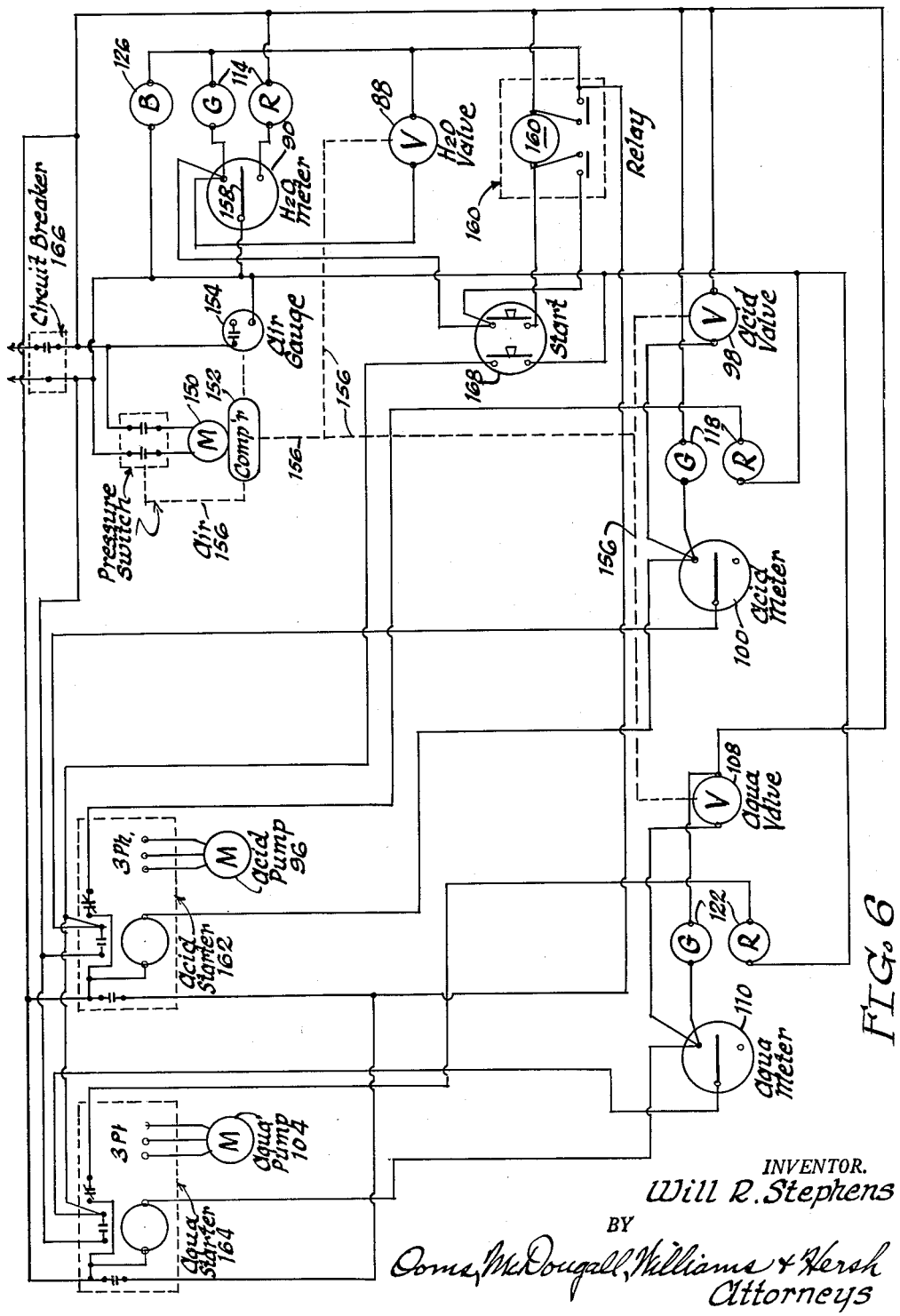
Figure 6 is an electrical diagram applicable to the unit described and claimed.

Having described the mechanical construction of the combined units and their operation, brief reference will now be made to the electrical diagram, as set forth in Figure 6, for operation of the equipment without automatic potash feed.

In the electrical diagram, the control elements are given the same number designations as in the foregoing description of the apparatus. It will be noticed that the electrical diagram illustrates an air compression motor 150, an air compression tank 152, and an air gauge 154, with lines 156 running from the tank 152 to the water valve, the acid valve, and the aqua ammonia valve. This is to control the back pressure of the valves for operation.

The basic electrical circuit consists of a single-pole, double-throw switch 158 in each of the water, acid and aqua ammonia meters 90, 100 and 110 respectively; a control relay 160; a magnetic starter 162 for the acid pump and a magnetic starter 164 for the aqua ammonia pump, each with circuit breakers and solenoid valves; a single-phase, 60-cycle, 110-volt circuit breaker 166; a start push button 168; and an indicating pilot light previously defined by the numeral 126.

In operation, the meters are set for delivery of a predetermined amount. This causes the single-pole, double-throw switch 158 in each of the meters to close contact. Upon depression of the start button 168 to make the start switch, the control relay 160 is energized. This in turn permits the 3-way solenoid valves, pump motors and indicating pilot light to be energized.

When each individual meter returns to zero, the electrical control is broken. This causes the 3-way solenoid valve and pump starter to be de-energized. The water meter is provided only with a solenoid valve since it operates on line pressure and therefore makes a pump unnecessary. The operating light 126 is tied in parallel with each of the meters, such that it remains lit throughout the entire operating cycle. It becomes de-energized when the contact is broken on the last of the meters to reach the shutoff point.

It will be apparent from the foregoing description that I have provided a compact piece of processing equipment for use in the safe and efficient preparation of liquid fertilizer mixtures and which can be located at various stations of use by reason of the portability of the equipment.

It will be understood that changes may be made in the details of construction, arrangement and operation without departing from the spirit of the invention, especially as defined in the following claims.

I claim:

1. Process equipment comprising a tank having a cylindrical upper section and a conically-shaped lower section having its apex at the bottom, a liquid outlet opening at the apex of the conical section at the bottom of the tank, a liquid inlet in the side wall of the cylindrical section spaced from the upper edge by an amount greater than the space above the liquid level, means for recirculating the liquid from the outlet at the bottom to the inlet in the side wall, a mixer mounted within the tank below the liquid level formed of an elongate inner member having an outlet at one end and an inlet at the opposite end to define a passage extending continuously therethrough, an outer member spaced about the inner member for a substantial length thereof and secured thereto in sealing relation to provide a confined chamber therebetween surrounding the inner member, a plurality of openings through the inner member for communicating the chamber with the passage through the inner member, and an inlet in communication with the chamber, means communicating the inlet to the inner member with a source of one liquid under pressure, means communicating the inlet to the chamber with another source of the liquid under pressure whereby the one liquid flowing through the passage draws the other liquid from the chamber for admixture therewith, a header in the base portion of the tank spaced from the bottom wall and having a plurality of outlets for issuing liquid mixture in various directions into the tank, and means communicating the outlet of the mixture with the header, and means controlling the amount of liquid introduced through each of said communicating means in the inlet to the mixer.

2. Process equipment as claimed in claim 1 which includes a nozzle at the inlet in the side wall of the tank for directing the liquid in tangential direction into the tank.

3. Process equipment as claimed in claim 2 in which the nozzle is arranged to direct the liquid into the tank at an angle of 0–30° with the tangent.

4. Process equipment as claimed in claim 1 which includes baffle plates vertically disposed in circumferentially spaced-apart relation about the side wall of the cylindrical section.

5. Process equipment as claimed in claim 4 in which the baffle plates are dimensioned to have a length of from $\frac{1}{10}$ to $\frac{1}{40}$ the diameter of the tank.

6. Process equipment as claimed in claim 4 in which the baffles extend into the tank in the direction of fluid flow at an angle of 65°, plus or minus 10° with the radius.

7. Process equipment as claimed in claim 1 in which the means for recirculating the liquid from the outlet to the inlet comprises an impeller pump.

8. Process equipment as claimed in claim 1 in which the mixer is formed of concentrically arranged tubular members defining a sealed annular space therebetween.

9. Process equipment as claimed in claim 1 in which the openings communicating the chamber with the passage through the inner member extend angularly from the outer wall inwardly in the direction of fluid flow.

10. Process equipment as claimed in claim 1 in which the outlets from the header comprise sprayheads positioned to introduce the liquid streams horizontally into the body of liquid in the tank.

11. Process equipment for producing a liquid fertilizer comprising a tank having a cylindrical upper section and a conically-shaped lower section having its apex at the bottom, a liquid outlet opening at the apex at the conical section, a liquid inlet in the side wall of the cylindrical section spaced from the upper edge by an amount greater than the space above the liquid level in the tank, means for recirculating liquid in the tank from the outlet at the bottom to the inlet in the side wall, a jet mixer mounted within the tank below the liquid level comprising a pair of inner and outer tubular members having a sealing relationship therebetween to define a sealed annular space between said members, an inlet at one end of the inner tubular member and an outlet at the other end of the inner tubular member, an inlet in the outer tubular member in communication with the annular space, a plurality of openings through the inner tubular member within the annular space to communicate the annular space with the passage through the inner tubular member from the inlet to the outlet, means communicating the inlet to the inner tubular member with a source of water under pressure, other means in communication with a supply of phosphoric acid under pressure joining with the water communication means immediately in advance of the mixer and means communicating the inlet to the annular space with a source of supply of aqua ammonia under pressure whereby aqua ammonia is drawn into the inner tubular member for admixture with the water during passage of the latter through the inner tubular member, and a header communicating with the outlet of the inner tubular member and openings in the header for the passage of liquid therefrom in various directions into the body of liquid in the tank.

12. Process equipment as claimed in claim 11 which includes means for stopping the flow of water through said communicating means when a predetermined amount of water has been delivered to the mixer, pump means for the delivery of aqua ammonia and means responsive to the amount of aqua ammonia delivered to inactivate said pump means for stopping fluid flow when a predetermined amount has been delivered, and separate pump means for the delivery of phosphoric acid and means responsive to the amount of phosphoric acid for inactivating the said pump to stop fluid flow when a predetermined amount of said acid has been delivered.

13. Process equipment as claimed in claim 11 in which the phosphoric acid supplied constitutes a superphosphoric acid.

References Cited in the file of this patent

UNITED STATES PATENTS

| | | |
|---|---|---|
| 1,832,179 | Boggiano-Pico | Nov. 17, 1931 |
| 1,872,024 | Bates | Aug. 16, 1932 |
| 2,708,619 | Winnicki et al. | May 17, 1955 |